(12) United States Patent
Ota

(10) Patent No.: US 12,039,865 B2
(45) Date of Patent: Jul. 16, 2024

(54) NOTIFICATION DEVICE TO DRIVER

(71) Applicant: TOYOTA JIDOSHA KABUSHIKI KAISHA, Toyota (JP)

(72) Inventor: Takashi Ota, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 305 days.

(21) Appl. No.: 17/500,619

(22) Filed: Oct. 13, 2021

(65) Prior Publication Data

US 2022/0122455 A1    Apr. 21, 2022

(30) Foreign Application Priority Data

Oct. 19, 2020 (JP) .................................. 2020-175314

(51) Int. Cl.
*G08G 1/0967*   (2006.01)
*B60K 35/00*    (2006.01)
*B60K 35/28*    (2024.01)

(52) U.S. Cl.
CPC .......... *G08G 1/0967* (2013.01); *B60K 35/00* (2013.01); *B60K 35/28* (2024.01); *B60K 2360/167* (2024.01); *B60K 2360/168* (2024.01)

(58) Field of Classification Search
CPC ............. G08G 1/0967; G08G 1/09623; G08G 1/09626; B60K 35/00; B60K 2370/167; B60K 2370/168; B60K 37/02; B60K 2370/175; B60W 2520/10; B60W 2554/406; B60W 40/04; B60W 2050/146; B60W 2555/60; B60W 50/14; B60W 60/00276; B60W 60/005

See application file for complete search history.

(56) References Cited

U.S. PATENT DOCUMENTS

| 2011/0190972 A1* | 8/2011 | Timmons ............... G08G 1/167 |
| | | 701/31.4 |
| 2012/0239253 A1* | 9/2012 | Schmidt ............ B62D 15/0265 |
| | | 701/41 |
| 2013/0268152 A1 | 10/2013 | Koshizen et al. |
| 2017/0203770 A1 | 7/2017 | Kondo |
| 2017/0267238 A1 | 9/2017 | Mimura et al. |
| 2018/0113450 A1* | 4/2018 | Sherony ................ B60W 10/04 |

(Continued)

FOREIGN PATENT DOCUMENTS

| CN | 108873905 A | 11/2018 |
| JP | 2005324661 A | 11/2005 |

(Continued)

*Primary Examiner* — Jason Holloway
(74) *Attorney, Agent, or Firm* — Dickinson Wright, PLLC

(57) ABSTRACT

In a vehicle enabling automated driving, if the value of at least one jam related parameter changing in accordance with a jam degree of surroundings of the vehicle is a value showing a jam degree lower than a reference value corresponding to a reference jam degree, the vehicle is driven in a first driving mode, and if the value of the jam related parameter is a value showing a jam degree higher than the reference value, the vehicle is driven in a second driving mode with a lower degree of contribution of the driver to driving than the first driving mode. A notification device used in the vehicle has a notification control part showing on a display device of the vehicle a display relating to the value of the jam related parameter and the reference value.

6 Claims, 7 Drawing Sheets

(56) References Cited

U.S. PATENT DOCUMENTS

| | | |
|---|---|---|
| 2019/0232976 A1 | 8/2019 | Uetani et al. |
| 2020/0298885 A1 | 9/2020 | Yashiro |
| 2023/0037467 A1* | 2/2023 | Yamamoto ........ B60W 60/0053 |

FOREIGN PATENT DOCUMENTS

| | | |
|---|---|---|
| JP | 2013215067 A | 10/2013 |
| JP | 2015184110 A | 10/2015 |
| JP | 2016028927 A | 3/2016 |
| JP | 2017024549 A | 2/2017 |
| JP | 2017165289 A | 9/2017 |
| JP | 2018146552 A | 9/2018 |
| JP | 2020152192 A | 9/2020 |
| JP | 2022035667 A | 3/2022 |

* cited by examiner

NOTIFICATION DEVICE TO DRIVER

FIELD

The present disclosure relates to a notification device to a driver.

BACKGROUND

In a vehicle enabling automated driving where at least part of the acceleration, braking, steering, or other driving operations of the vehicle are automatically performed by the vehicle, it is known to switch the driving mode (for example, between an automated driving mode and manual driving mode) and control state of the automated driving control, in accordance with the driving environment (JP2005-324661A, JP2013-215067A, JP2018-146552A, JP2015-184110A, JP2016-028927A, and JP2017-165289A). In particular, in the automated driving vehicles described in JP2005-324661A, JP2013-215067A, JP2018-146552A, and JP2015-184110A, when judging whether to perform the different driving modes or switch of the control state of the automated driving control, the state of jam in the surroundings of the vehicle is considered.

Further, in the automated driving vehicle of JP2016-028927A, when the driving mode is switched, the timing of switching is notified to the user. In addition, in the automated driving vehicle described in JP2017-165289A, when automated driving control cannot be performed, the reason is notified to the user.

SUMMARY

In this regard, if the driving mode of the vehicle is switched, the degree of contribution of the driver to the driving of the vehicle changes. Therefore, it is preferable that the driver can, to a certain extent, obtain a grasp of the timing at which the driving mode of the vehicle is switched.

On the other hand, as explained above, it is considered to judge switching of the driving mode based on the state of jam in the surroundings of the vehicle. However, the driver cannot obtain a grasp of how the state of jam in the surroundings of the vehicle is recognized by the vehicle. Further, sometimes there is a difference in recognition of the state of jam between the driver and the vehicle. For this reason, the driver cannot obtain a grasp of extent of change in the state of jam from the current state necessary for the driving mode to be switched. As a result, there is a possibility of a psychological burden or rapid change of driving being forced on the driver.

In consideration of the above problem, an object of the present disclosure is to provide a notification device which enables a driver to obtain a grasp of extent of change in a state of jam of the surroundings of a vehicle necessary for a driving mode to be switched.

The present invention has as its gist the following.

(1) A notification device to a driver used in a vehicle enabling automated driving in which if the value of at least one jam related parameter changing in accordance with a jam degree of surroundings of the vehicle is a value showing a jam degree lower than a reference value corresponding to a reference jam degree, the vehicle is driven in a first driving mode, and if the value of the jam related parameter is a value showing a jam degree higher than the reference value, the vehicle is driven in a second driving mode with a lower degree of contribution of the driver to driving than the first driving mode, the notification device comprising a notification control part making a display device of the vehicle display signs relating to the value of the jam related parameter and the reference value.

(2) The notification device according to above (1), wherein the driving mode of the vehicle is set based on the value of one of the jam related parameters, and the notification control part makes the display device display signs relating to the value of the one jam related parameter and the one reference value.

(3) The notification device according to above (1), wherein the driving mode of the vehicle is set to the second driving mode if the value of a predetermined parameter among a plurality of the jam related parameters is a value showing a higher jam degree than the respective reference value, and is set to the first driving mode if that predetermined parameter is a value showing a lower jam degree than the reference value, and the notification control part makes the display device display signs relating to values of part or all of the plurality of parameters among the jam related parameters and the reference values of that plurality of parameters.

(4) The notification device according to above (3), wherein the notification control part does not make the display device display signs relating to the value of the jam related parameter becoming a value showing a higher jam degree than the reference value among the plurality of jam related parameters when the driving mode of the vehicle is the first mode and the reference value corresponding to the jam related parameter.

(5) The notification device according to above (1) to (4), wherein the jam related parameters include parameters changing in accordance with at least one of a difference between a speed of the vehicle and a legal speed limit of the road on which the vehicle is running, a difference of speeds of other vehicles in the surroundings of the vehicle and the legal speed limit, and a density or number of presence of other vehicles in a surrounding region of the vehicle.

(6) The notification device according to any one of above (1) to (5), wherein a reference value when the driving mode of the vehicle is the first driving mode is a value showing a higher jam degree than a reference value when the driving mode is the second driving mode.

According to the present disclosure, it becomes possible for a driver to obtain a grasp of to what extent a state of jam of the surroundings of a vehicle should change for a driving mode to be switched.

DESCRIPTION OF EMBODIMENTS

Figure 1:
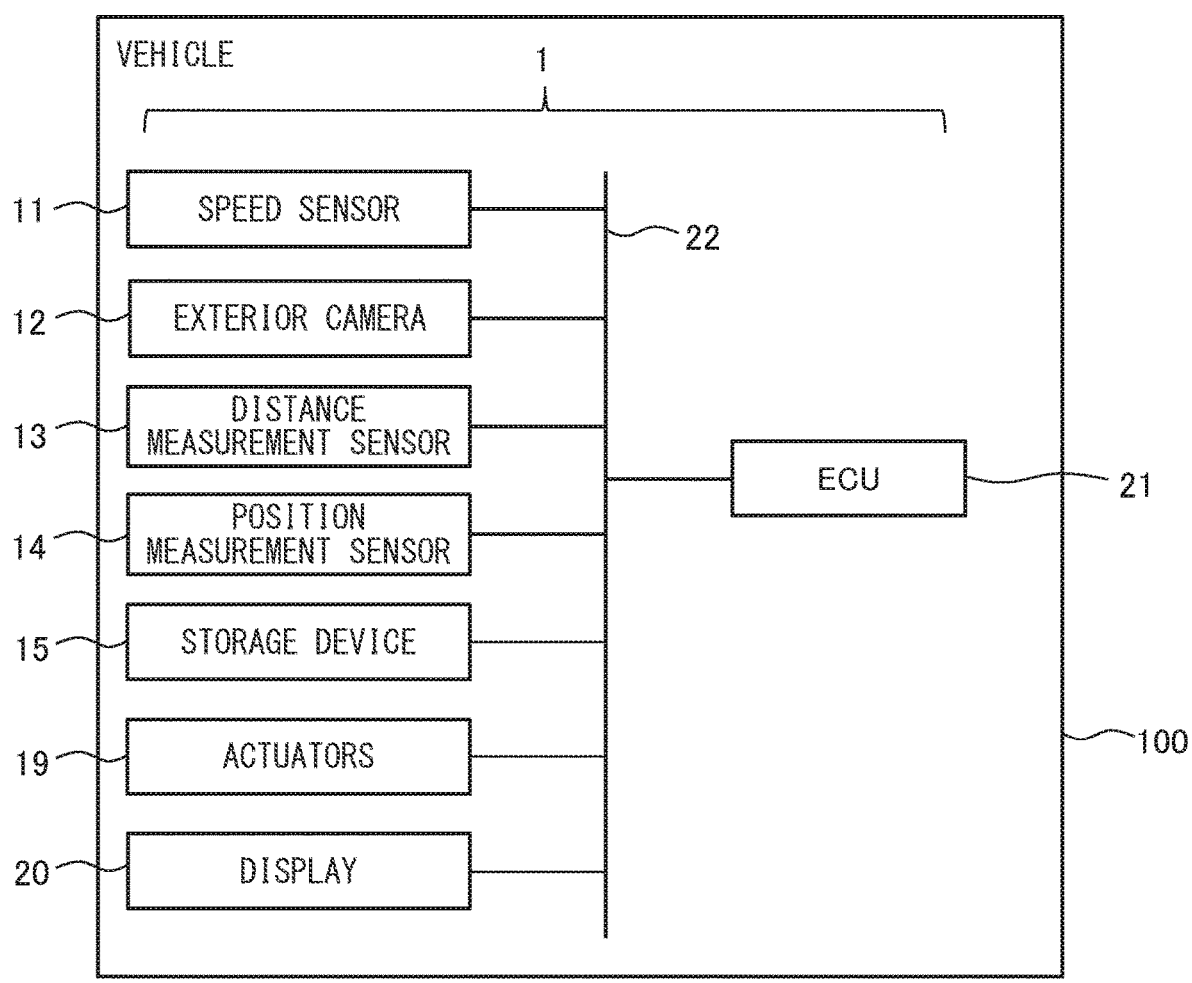
FIG. 1 is a view of the configuration schematically showing a vehicle control system mounted in a vehicle.

Below, embodiments will be explained in detail while referring to the drawings. Note that, in the following explanation, similar components are assigned the same reference notations.

First Embodiment

Configuration of Vehicle Control System

First, a vehicle control system 1 and a notification device according to the first embodiment will be explained. FIG. 1 is a view of the configuration schematically showing the vehicle control system 1 mounted in a vehicle 100 enabling automated driving in which at least part of the acceleration, braking, steering, and other vehicle driving operations are automatically performed by the vehicle. The vehicle control system 1 can operate the vehicle 100 in a plurality of driving modes different in degree of contribution of the driver to the driving.

As shown in FIG. 1, the vehicle control system 1 has a speed sensor 11, exterior camera 12, distance measurement sensor 13, position measurement sensor 14, storage device 15, actuators 19, display 20, and electronic control unit (below, referred to as "ECU") 21.

However, the vehicle control system 1 need not necessarily have all of them. For example, the vehicle control system 1 need not necessarily have the distance measurement sensor 13 so long as having the exterior camera 12.

The speed sensor 11, exterior camera 12, distance measurement sensor 13, position measurement sensor 14, storage device 15, actuators 19, display 20, and ECU 21 are connected to be able to communicate through an internal vehicle network 22. The internal vehicle network 22 is a network based on the CAN (Controller Area Network) or other standard. Note that, in the present embodiment, the speed sensor 11 and ECU 21 and all other components are connected to be able to communicate with each other through the internal vehicle network, but some of the components may also be directly connected to other components by cables, etc., without going through the internal vehicle network.

The speed sensor 11 is a sensor detecting a speed of the vehicle 100. The speed sensor 11, for example, detects a rotational speed of a drive shaft of the vehicle 100, and detects the speed of the vehicle 100 based on the detected rotational speed. The output signal of the speed sensor 11 is output through the internal vehicle network 22 to the ECU 21. The ECU 21 can detect acceleration of the vehicle 100 based on the history of the speed of the vehicle 100 detected by the speed sensor 11.

The exterior camera 12 is a device capturing images of the surroundings of the vehicle. The exterior camera 12 has a two-dimensional detector (CCD, C-MOS, etc.) configured by an array of opto-electric conversion elements having sensitivity to visible light, and an image-forming optical system forming an image of a region being captured on that two-dimensional detector. In the present embodiment, the exterior camera 12 is for example attached inside the vehicle 100 so as to capture the surroundings of the vehicle 100, in particular the front region. However, exterior cameras 12 may also be attached so as to capture images of the back region and left and right regions in addition to the front region. The exterior camera 12 captures the front region of the vehicle 100 every predetermined capture period (for example 1/30 second to 1/10 second), and generates an image in which that front region is shown. The exterior camera 12 outputs the generated image through the internal vehicle network 22 to the ECU 21 each time generating an image. Note that, the exterior camera 12 may be a single lens camera or may be a stereo camera. If a stereo camera is used as the exterior camera 12, the exterior camera 12 may function as a distance measurement sensor 13. The vehicle 100 may also be provided with a plurality of exterior cameras differing in image capturing direction or focal distance.

The distance measurement sensor 13 is a sensor measuring the distance to an object present in the surroundings of the vehicle 100. In the present embodiment, the distance measurement sensor 13 can also measure the orientation of the object present in the surroundings of the vehicle 100. The distance measurement sensor 13 is, for example, a milliwave radar or other radar or a LIDAR device. Further, the distance measurement sensor 13 may be configured so as to be able to measure the relative speed with an object present in the surroundings of the vehicle 100. In the present embodiment, the distance measurement sensor 13 measures the distance to an object present in front of the vehicle. The distance measurement sensor 13 outputs the result of measurement of distance to an object in the surroundings every predetermined period through the internal vehicle network 22 to the ECU 21.

The position measurement sensor 14 is a sensor measuring the self-position of the vehicle 100. The position measurement sensor 14 is, for example, a GPS (global positioning system) receiver. The GPS receiver receives GPS signals from a plurality of GPS satellites and measures the self-position of the vehicle 100 based on the received GPS signals. The position measurement sensor 14 outputs the result of measurement of the self-position of the vehicle 100 every predetermined period through the internal vehicle network 22 to the ECU 21. Note that, the position measurement sensor 14 may also be a receiver based on another satellite position measurement system if able to measure the self-position of the vehicle 100.

The storage device 15, for example, has a hard disk drive or nonvolatile semiconductor memory. The storage device 15 stores map information. The map information includes information showing the position of a section and information relating to road indications (for example, lanes, dividing lines, or stop lines), for each predetermined section of a road. The storage device 15 reads out map information in accordance with a read request of map information from the ECU 21, and sends the map information through the internal vehicle network 22 to the ECU 21.

The actuators 19 are actuators controlling acceleration, braking, steering, and other driving operations of the vehicle 100. If, for example, the vehicle 100 is driven by an internal combustion engine, the actuator 19 includes a motor controlling an opening degree of a throttle valve provided in an intake passage of the internal combustion engine. This motor functions as an actuator controlling the acceleration of the vehicle 100. Further, if the vehicle 100 is driven by a motor-generator, the actuator 19 includes an inverter controlling the motor-generator, etc. The inverter, etc., functions as an actuator controlling the acceleration and braking of the vehicle 100. Further, the actuator 19 may include a motor controlling the pressing force of the brake pads to the brake rotor. This motor functions as an actuator controlling the braking the vehicle 100. In addition, the actuator 19 may include a motor controlling a rotational angle of a steering shaft changing the orientation of the front wheels. This motor functions as an actuator controlling the steering. The actuators 19 receive control signals from the ECU 21 and operate in accordance with the received control signals.

The display 20 is one example of a display device displaying information relating to the vehicle 100 and the driving of the vehicle 100. The display 20, for example, is a liquid crystal display or organic EL display or other device displaying an image on the screen. Alternatively, the display 20 may also be a heads up display projecting an image on the window glass in the front of the vehicle 100 or another transparent plate provided at the front of the driver. Whatever the case, the display 20 may be any type of display so long as able to display an image. The display 20 is connected through the internal vehicle network 22 to the ECU 21. The display 20 receives a display signal from the ECU 21 and displays an image corresponding to the received display signal.

Figure 2:
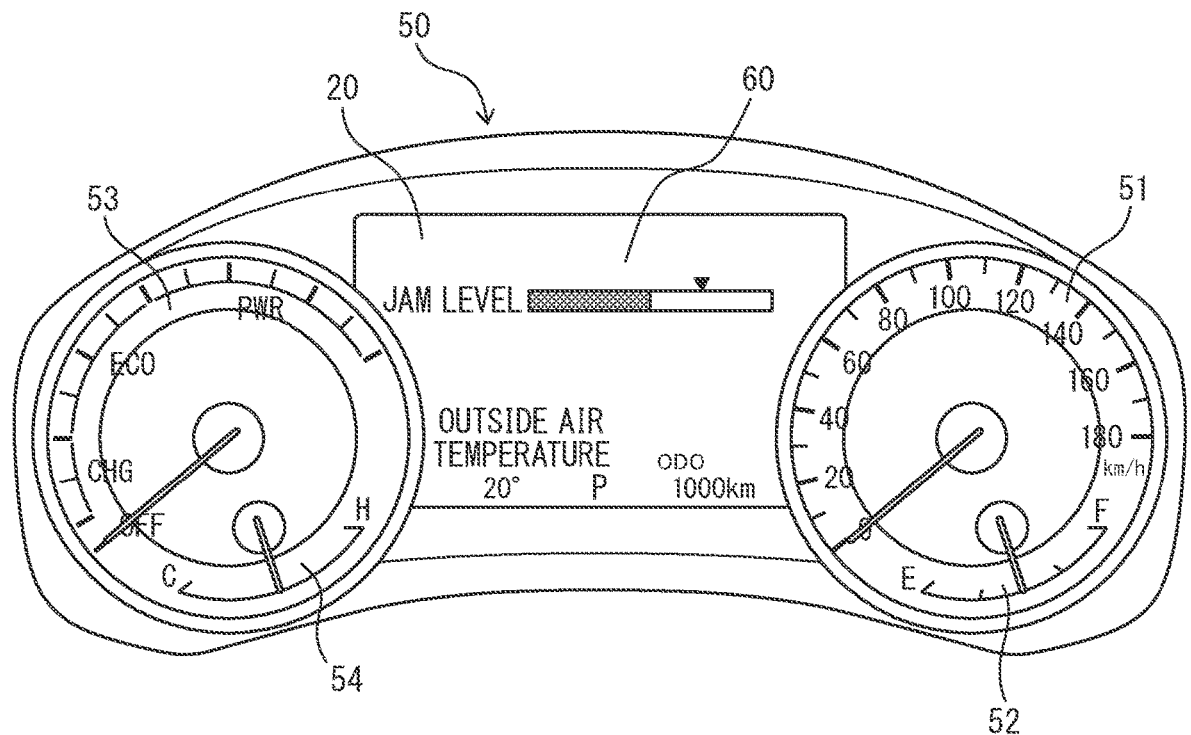
FIG. 2 is a view schematically showing an instrument panel provided inside a vehicle.

FIG. 2 is a view schematically showing the instrument panel 50 provided inside the vehicle 100. The instrument panel 50 shown in FIG. 2 is arranged so as to be positioned inside the vehicle 100 in the front of the driver.

As shown in FIG. 2, the instrument panel 50 is provided with a speedometer 51 displaying the speed of the vehicle 100, a fuel gauge 52 showing the remaining amount of fuel, a hybrid system indicator 53 showing output of the hybrid system or the regeneration level, and a water temperature meter 54 showing a cooling water temperature of the internal combustion engine. In addition, the instrument panel 50 is provided with the display 20 among these speedometer 51, fuel gauge 52, hybrid system indicator 53, and water temperature meter 54. The display 20 displays various warning lights and various other information in addition to information relating to the later explained jam degree.

The ECU 21 is one example of a driving control device performing driving control processing controlling driving operations of the vehicle 100. Further, the ECU 21 is one example of a notification device performing notification processing notifying information relating to the driving operation of the vehicle 100 to the driver.

Figure 3:
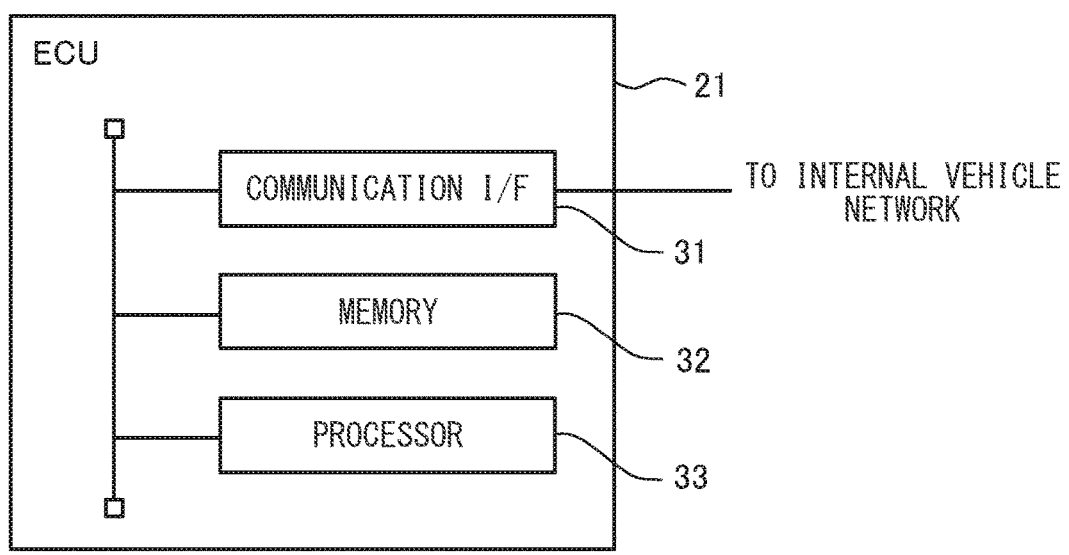
FIG. 3 is view of a hardware configuration of an ECU according to one embodiment.

FIG. 3 is a view of the hardware configuration of the ECU 21 according to one embodiment. The ECU 21 has a communication interface 31, memory 32, and processor 33. Note that, the communication interface 31, memory 32, and processor 33 may be separate circuits. Alternatively, they may also be configured as a single integrated circuit.

The communication interface 31 is a circuit for connecting the ECU 21 to the internal vehicle network 22. The ECU 21 send signals to or receives signals from the speed sensor 11, exterior camera 12, and other devices, through the communication interface.

The memory 32 is a storage device storing data. The memory 32, for example, has a volatile semiconductor memory and a nonvolatile semiconductor memory. The memory 32 stores programs for the driving control processing and the notification processing performed by the processor 33 of the ECU 21. Further, the memory 32 stores images captured by the exterior camera 12, the speed of the vehicle 100, the results of measurement of the distances to objects in the surroundings of the vehicle, input information from the passengers, various data used in the driving control processing and the notification processing, etc.

The processor 33 has one or more CPUs (central processing units) and their peripheral circuits. The processor 33 may further have another processing circuit such as a logic unit or arithmetic unit. The processor 33 performs the driving control processing to control the actuators 19 relating to driving operations of the vehicle 100, and performs the display processing of the display 20 to control the display at the display 20.

Driving Mode of Vehicle

In the present embodiment, the ECU 21 can switch the driving mode of the vehicle 100 among a plurality of modes with different degrees of contribution of the driver to the driving. In particular, in the present embodiment, the ECU 21 can switch the driving mode among an automated driving mode where driving operations are autonomously performed by the vehicle 100 (for example, corresponding to level 3 of SAE), a driving assistance mode where driving assistance of the driver is performed by the vehicle 100 (for example, corresponding to level 2 of SAE), and a manual driving mode where driving operations of the vehicle 100 are performed by the driver (for example, corresponding to level 0 of SAE). The degree of contribution of the driver to the driving in the automated driving mode is smaller than the degree of contribution of the driver to the driving in the driving assistance mode, while the degree of contribution of the driver to the driving in the driving assistance mode is smaller than the degree of contribution of the driver to the driving in the manual driving mode.

In the manual driving mode, the ECU 21 sends control signals to actuators 19 performing acceleration, deceleration, and steering of the vehicle 100 or other ECUs controlling the actuators 19, in accordance with input from operating devices of the vehicle 100. Specifically, ECU 21 controls the actuator 19 relating to acceleration of the vehicle 100 in accordance with input from the accelerator pedal. Further, the ECU 21 controls the actuator 19 relating to braking of the vehicle in accordance with input from the brake pedal. Further, the ECU 21 controls the actuator 19 relating to steering of the vehicle 100 in accordance with input from the steering wheel.

Further, in the driving assistance mode, the ECU 21 assists operations by the driver relating to acceleration, braking, and steering of the vehicle 100. For example, the ECU 21 controls the actuators 19 controlling acceleration and braking of the vehicle 100 so as to follow a preceding vehicle running immediately in front in the same lane as the vehicle 100 and so as to run by the preset setting speed in the case where there is no preceding vehicle. Further, the ECU 21 controls the actuator 19 relating to steering of the vehicle 100 so as to return to the original driving lane if the vehicle 100 departs from the current driving lane during steering of the driver. For example, the ECU 21 assists operations by the driver in accordance with the following procedure.

First, the ECU 21 detects a preceding vehicle in front of the vehicle 100, dividing lines, etc. from the series of time-wise images obtained by the exterior camera 12 and the series of time-wise distance information obtained by the distance measurement sensor 13. Further, the ECU 21 calculates the target speed of the vehicle 100 based on the relative speed or distance with the preceding vehicle, and sends control signals to the actuators 19 relating to acceleration and braking of the vehicle 100 so that the speed of the vehicle 100 becomes a calculated target speed. Further, the ECU 21 calculates the relative position between a detected dividing line and the vehicle 100, and sends a control signal to the actuator 19 relating to the steering so that the vehicle 100 moves away from the dividing line when the vehicle 100 approaches a dividing line by equal to or less than a predetermined distance.

In addition, in the automated driving mode, the ECU 21 sends control signals to actuators 19 performing the acceleration, braking, and steering of the vehicle 100 and other ECUs controlling these actuators 19, regardless of input from the operating devices of the vehicle 100. The ECU 21 controls these actuators 19 to, for example, make the vehicle 100 autonomously run along the drive route set by a navigation system (not shown). For example, the ECU 21 makes the vehicle 100 autonomously run in accordance with the following procedure.

First, the ECU 21 detects objects and road indications, etc., in the surroundings of the vehicle 100 from the series of time-wise images obtained by the exterior camera 12 and the series of time-wise distance information obtained by the distance measurement sensor 13. Further, the ECU 21 sets the drive path of the vehicle 100 in the drive route so that detected objects and vehicles 100 do not collide and so that road indications are observed. The ECU 21 also sets the target time for the vehicle 100 to reach each point of the drive path when setting the drive path.

After that, the ECU 21 determines the amount of acceleration, the amount of braking, the amount of steering, and other control amounts so that the vehicle 100 runs along the drive path. Further, the ECU 21 sends control signals relating to acceleration, braking, and the steering of the vehicle 100 to the actuators 19 in accordance with the determined control amounts.

Note that, in the present embodiment, the ECU 21 switches the driving mode among the automated driving mode, driving assistance mode, and manual driving mode. However, the driving mode of the vehicle 100 may be switched with other types of modes so long as able to be switched among a plurality of modes differing in degree of contribution of the driver to the driving. Therefore, for example, the automated driving mode may be a driving mode with a higher degree of contribution of the driver to the driving more than explained above (for example, lane changes not being performed automatically, etc.) The ECU 21 may switch driving modes among two modes or among four or more modes.

Processing for Setting Driving Mode

In the present embodiment, whether the driving mode of the vehicle 100 is made the manual driving mode or is made the automated driving mode or the driving assistance mode is set by the driver. On the other hand, in the present embodiment, the ECU 21 uses the driving control processing to automatically switch the driving mode of the vehicle 100 between the automated driving mode and the driving assistance mode. In particular, in the present embodiment, when the jam degree of the surroundings of the vehicle 100 is high, the vehicle 100 is driven by the automated driving mode, while when the jam degree of the surroundings of the vehicle 100 is low, the vehicle 100 is driven by the driving assistance mode.

Figure 4:
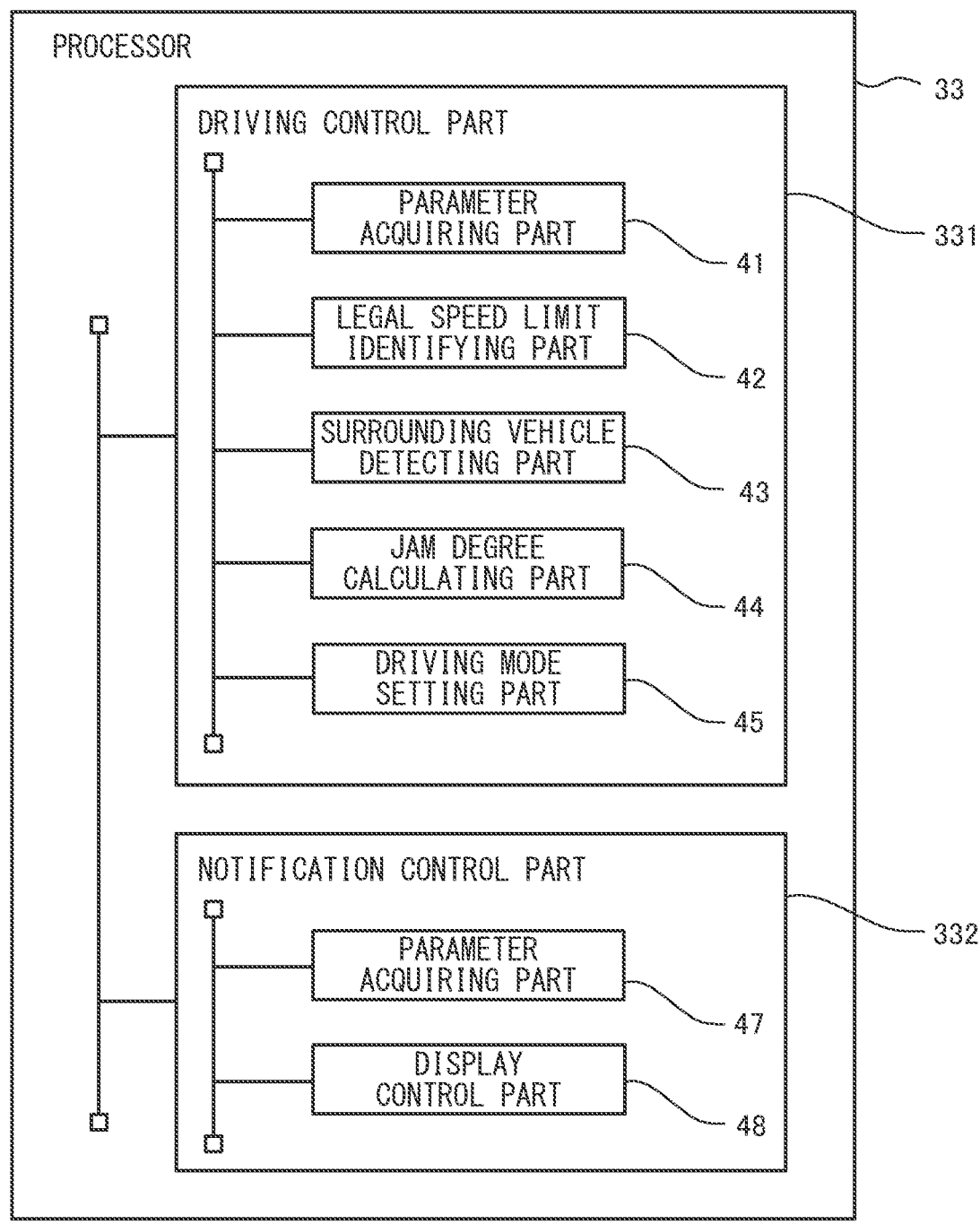
FIG. 4 is a functional block diagram of a processor of an ECU relating to driving control processing setting a driving mode of the vehicle and notification processing.

FIG. 4 is a functional block diagram of the processor 33 of the ECU 21 relating to the driving control processing for setting the driving mode of the vehicle 100 and the notification processing. As shown in FIG. 4, the processor 33 is provided with a driving control part 331 for performing driving control processing for setting the driving mode of the vehicle 100, and a notification control part 332 for performing notification processing for notifying information relating to driving operations of the vehicle 100 to the driver. These functional blocks of the processor 33, for example, are functional modules realized by a computer program operating on the processor 33. Alternatively, these functional blocks of the processor 33 may be dedicated processing circuits provided at the processor 33.

As shown in FIG. 4, the driving control part 331 has a parameter acquiring part 41, legal speed limit identifying part 42, surrounding vehicle detecting part 43, jam degree calculating part 44, and driving mode setting part 45.

The parameter acquiring part 41 acquires parameters from the various sensors of the vehicle control system 1. In the present embodiment, the parameter acquiring part 41 acquires the speed of the vehicle 100 based on the output of the speed sensor 11 and, further, acquires the self-position of the vehicle 100 measured by the position measurement sensor 14.

The legal speed limit identifying part 42 identifies the legal speed limit of the road on which the vehicle 100 is currently running. The legal speed limit is identified based on, for example, the self-position of the vehicle 100 and the map information stored in the storage device 15. The map information includes legal speed limit information of the different roads. The legal speed limit identifying part 42 identifies the legal speed limit of the road corresponding to the self-position of the vehicle 100 measured by the position measurement sensor 14 as the legal speed limit of the road on which the vehicle 100 is currently running. Note that, the legal speed limit identifying part 42 may use another method to identify the legal speed limit of the road on which the vehicle 100 is currently running. Specifically, for example, the legal speed limit identifying part 42 may conceivably detect speed signs in the images captured by the exterior camera 12 by any recognition processing and identify the legal speed limit of the road on which the vehicle 100 is currently running based on the detected speed signs.

The surrounding vehicle detecting part 43 detects the positions, speeds, and sizes of other vehicles in the surroundings of the vehicle 100. The surrounding vehicle detecting part 43, for example, detects vehicles in an image captured by the exterior camera 12 by any recognition processing, and detects positions of other vehicles in the surroundings of the vehicle 100 based on the positions of the recognized vehicles in the image and the output of the distance measurement sensor 13. In addition, the surrounding vehicle detecting part 43 calculates the relative speeds of the other vehicles in the surroundings of the vehicle 100, and the vehicle 100 based on the output of the distance measurement sensor 13 and calculates the speeds of the other vehicles in the surroundings of the vehicle 100, based on the relative speeds and the speed of the vehicle 100 detected by the speed sensor 11. Furthermore, in the present embodiment, the surrounding vehicle detecting part 43 detects the sizes (lengths) of the other vehicles in the surroundings of the vehicle 100, based on the positions and sizes of the recognized vehicles in the image and the output of the distance measurement sensor 13.

The jam degree calculating part 44 calculates the degree of jam in the surroundings of the vehicle 100. In the present embodiment, the following formula (1) is used to calculate the jam level LJ as a jam related parameter changing in accordance with the jam degree of the surroundings of the vehicle 100.

$$LJ = A \times HV + B \times CV + C \times VD \tag{1}$$

$$HV = (Vl - Vh)/Vh \tag{2}$$

$$CV = (Vl - Vc)/Vc \qquad (3)$$

$$VD = Ltv/Lr \qquad (4)$$

In formula (1), A, B, and C are constants. The optimal values are found in advance by experiments or calculation.

Further, HV in formula (1) is the ego vehicle term relating to the speed of the vehicle 100 and is calculated by the above formula (2). Vl of formula (2) shows the legal speed limit, while Vh shows the speed of the vehicle 100. Therefore, the ego vehicle term changes in accordance with the difference between the speed Vh of the vehicle 100 and the legal speed limit Vl. The value identified by the legal speed limit identifying part is substituted for the legal speed limit Vl, while the value acquired by the parameter acquiring part 41 is substituted for the speed Vh of the vehicle 100. The ego vehicle term HV becomes smaller as the speed of the vehicle 100 becomes higher. Further, if the value calculated by the right side of the above formula (2) is a negative value, the ego vehicle term HV is made zero. Note that, the ego vehicle term HV may be a parameter found by a method other than the right side of the above formula (2) so long as a parameter which becomes smaller as the speed of the vehicle 100 becomes higher.

The CV in formula (1) is the surrounding vehicle term relating to other vehicles in the surroundings of the vehicle 100, and is calculated by the above formula (3). Vc of formula (3) shows the average speed of other vehicles (below, referred to as "surrounding vehicles") running in a predetermined range around the vehicle 100 (below, referred to as the "surrounding region") in the driving lanes with the same direction of advance as the vehicle 100. Therefore, the speed Vc of the other vehicles is found by averaging the speeds of the surrounding vehicles calculated by the surrounding vehicle detecting part 43. The surrounding vehicle term CV becomes smaller as the average speed of the surrounding vehicles becomes higher. Accordingly, the surrounding vehicle term is a parameter changing in accordance with the difference between the speed Vc of the other vehicles in the surroundings of the vehicle 100 and the legal speed limit Vl. Further, if the value calculated by the right side of the above formula (3) is a negative value, the surrounding vehicle term CV is made zero. Note that, the surrounding vehicle term CV may be a parameter found by a method other than the right side of the above formula (3) so long as a parameter which becomes smaller as the speed of the surrounding vehicles becomes higher.

VD in formula (1) is a density term relating to the degree that other vehicles are present in the surrounding region at the surroundings of the vehicle 100 (density by which other vehicles are present), and is calculated by the above formula (4). Ltv of formula (4) expresses the sum of the total lengths of the surrounding vehicles running in the surrounding region, and is calculated by totaling up the sizes (lengths) of the other vehicles calculated by the surrounding vehicle detecting part 43. Lr of formula (4) expresses the total length of the surrounding region. For example, if the vehicle 100 is running on a road with three lanes at a side, the surrounding region has a value of 3 times the length in the front-back direction of the above-mentioned predetermined range. Note that, if showing the extent by which other vehicles are present in the surrounding region, the density term VD may also be a parameter found by a method other than the right side of the above formula (4) such as for example the number of other vehicles present in the surrounding region.

Note that, the jam level LJ may be a parameter changing in accordance with some of the above-mentioned ego vehicle term, surrounding vehicle term, and density term.

Further, the jam level LJ may also be value changing in accordance with another parameter (for example, the value of the speed of the vehicle 100 divided by the acceleration, the value of the average speed of the surrounding vehicle divided by the average acceleration, the value of the difference of the speed of the preceding vehicle and the legal speed limit divided by the speed of the preceding vehicle, the value of the speed of the preceding vehicle divided by the acceleration, etc.) in addition to the above-mentioned ego vehicle term, surrounding vehicle term, and density term or instead of these parameters.

Further, the value of the jam related parameter showing the jam degree in the surrounding region of the surroundings of the vehicle 100 may also be found by another method. For example, the server communicating with the vehicles may calculate the values of the jam related parameter at different points of the roads based on the position information of the vehicles, and send the calculated values of the jam related parameter to the vehicle, thus the vehicle 100 may receive the values of the jam related parameter from the server.

The driving mode setting part 45 sets the driving mode based on the value of the jam level LJ calculated by the jam degree calculating part 44. Specifically, the driving mode setting part 45 sets the driving mode to the automated driving mode with a low degree of contribution of the driver to driving when the jam level LJ is equal to or greater than a preset reference jam level LJref and thus the jam degree is high. On the other hand, the driving mode setting part 45 sets the driving mode to the driving assistance mode with a high degree of contribution of the driver to the driving when the jam level LJ is less than a reference jam level LJref and thus the jam degree is low. Note that, the reference jam level LJref is the value which the jam level takes at the time of the jam degree used as the reference (below, referred to as the "reference jam degree"). The reference jam degree is set in advance considering the driving performance, etc., in the high speed automated driving mode.

In the present embodiment, the reference jam level LJref has hysteresis so that the driving mode of the vehicle 100 does not frequently change. Therefore, the reference jam level LJref when the driving mode of the vehicle 100 is the driving assistance mode is set so as to be higher than the reference jam level LJref when the driving mode of the vehicle 100 is the automated driving mode.

Note that, while having hysteresis, the reference jam degree is constant without changing in accordance with other parameters. Accordingly, the reference jam level LJref is also constant. However, the reference jam degree (therefore, reference jam level LJref) may also be changed based some other parameter. Specifically, for example, the reference jam degree may be changed based on the time of day.

Whatever the case, in the present embodiment, if the value of the jam level LJ, which is a jam related parameter changing in accordance with the jam degree of the surroundings of the vehicle, is a value showing a lower jam degree than the reference jam level LJref corresponding to the reference jam degree, the vehicle 100 is driven in the first driving mode (in the above-mentioned example, the driving assistance mode). In addition, if the value of the jam level LJ is a value showing a higher jam degree than the reference jam level LJref, the vehicle 100 is driven by the second driving mode with a lower degree of contribution of the driver to driving than the first driving mode (in the above-mentioned example, the automated driving mode).

Figure 5:
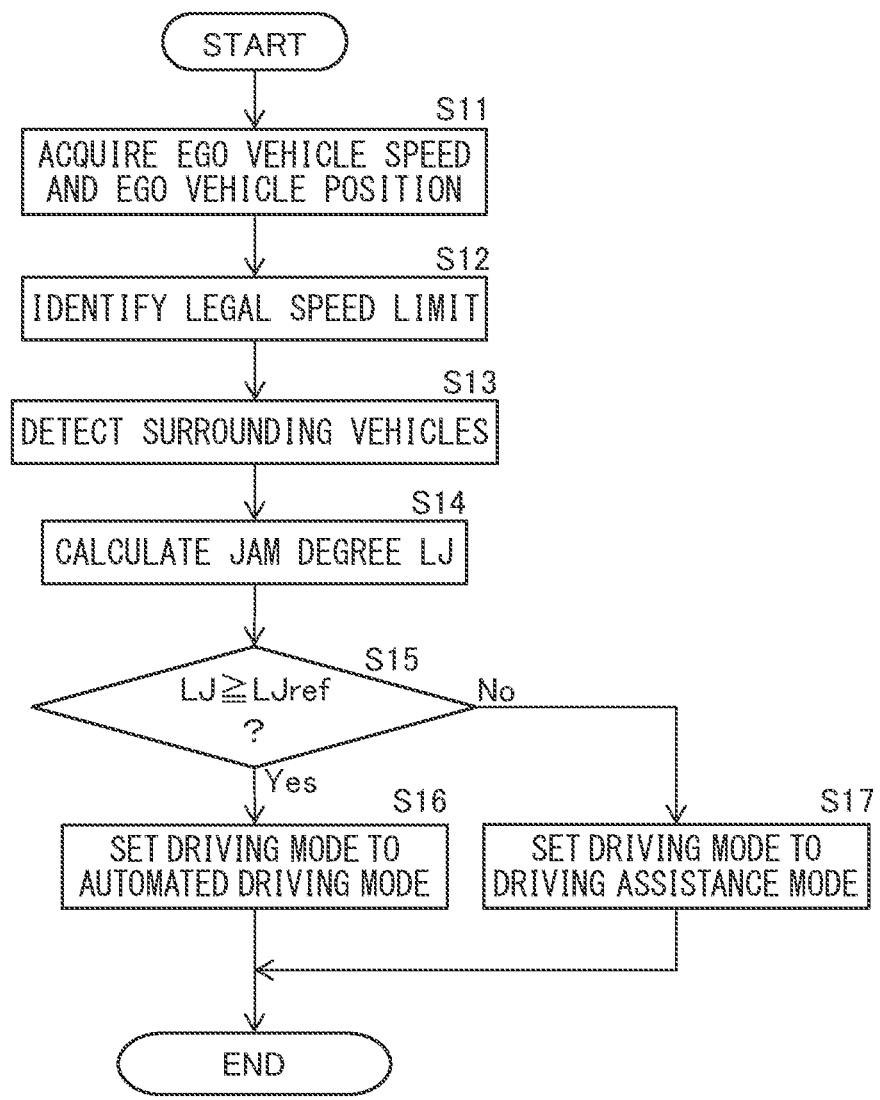
FIG. 5 is a flow chart of driving control processing performed by the ECU.

FIG. 5 is a flow chart of driving control processing performed by the ECU 21. As shown in FIG. 5, first, the parameter acquiring part 41 acquires the speed of the vehicle 100 and the self-position of the vehicle 100, based on the outputs of the speed sensor 11 and the position measurement sensor 14 (step S11).

Next, the legal speed limit identifying part 42 identifies the legal speed limit of the road on which the vehicle 100 is currently running, based on the self-position of the vehicle 100 acquired at step S11 and the map information stored in the storage device 15 (step S12).

Then, the surrounding vehicle detecting part 43 detects the positions, speeds, and sizes (lengths) of the other vehicles surrounding the vehicle 100 (surrounding vehicles) (step S13). As explained above, the surrounding vehicle detecting part 43 detects them, based on the images captured by the exterior camera 12 and the information of the distances to the objects in the surroundings of the vehicle 100 detected by the distance measurement sensor 13.

Next, the jam degree calculating part 44 calculates the jam level LJ at the surroundings of the vehicle 100. The jam degree calculating part 44 uses the above formulas (1) to (4) to calculate the jam level LJ (step S14).

If the jam level LJ is calculated, the driving mode setting part 45 judges whether the calculated jam level LJ is equal to or greater than the reference jam level LJref (step S15). If it is judged that the calculated jam level LJ is equal to or greater than the reference jam level LJref, that is, if the surroundings of the vehicle 100 are congested and thus the vehicle 100 cannot run at a high speed, the driving mode setting part 45 sets the driving mode to the automated driving mode (step S16). On the other hand, if it is judged at step S15 that the calculated jam level LJ is less than the reference jam level LJref, that is, if the surroundings of the vehicle 100 are not congested and thus the vehicle 100 can run at a high speed, the driving mode setting part 45 sets the driving mode to the driving assistance mode (step S17).

Notification Processing

Further, in the present embodiment, the display 20 displays the jam level LJ and the reference jam level LJref. In particular, in the present embodiment, as shown in FIG. 2, a jam information display region 60 is provided at the center of the display 20. At this jam information display region 60, a jam level LJ and a reference jam level LJref are displayed.

Figure 6:
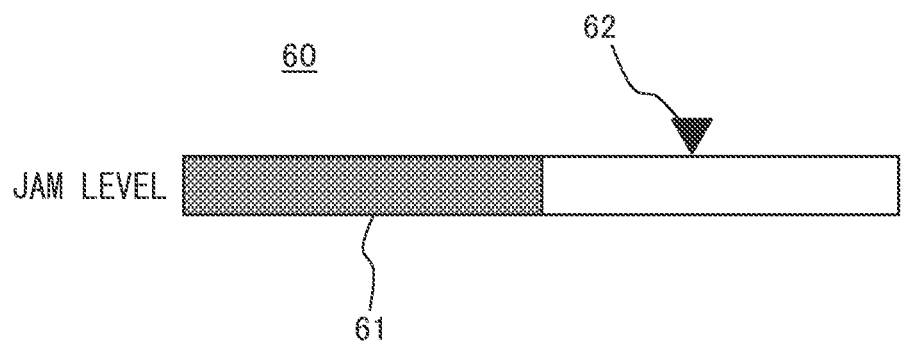
FIG. 6 is an enlarged view showing a jam information display region.

FIG. 6 is an enlarged view showing a jam information display region 60. As shown in FIG. 6, the jam information display region 60 displays an indicator bar 61 and indicator mark 62. The indicator bar 61 shows the jam level LJ calculated by the jam degree calculating part 44 and changes in length from the reference (left end in the figure) in accordance with the jam level. In the present embodiment, the indicator bar 61 becomes longer as the jam level LJ becomes higher. The indicator mark 62 shows the reference jam level LJref and is arranged so as to point to the position where the indicator bar 61 reaches when the indicator bar has a length corresponding to the reference jam level LJref.

The notification processing, which displays the jam level LJ, etc., on the display 20 in this way to notify the jam level of the surroundings of the vehicle 100, is performed by the notification control part 332 of the processor of the ECU 21. As shown in FIG. 4, the notification control part 332 has a parameter acquiring part 47 and a display control part 48.

The parameter acquiring part 47 acquires parameters from the driving control part 331 of the processor 33 and, in some cases, from the various sensors of the vehicle control system 1. In the present embodiment, the parameter acquiring part 47 acquires the calculated jam level LJ from the jam degree calculating part 44. In addition, the parameter acquiring part 47 acquires the reference jam level LJref from the driving mode setting part 45. Note that, if the reference jam level LJref is a constant value, the reference jam level LJref need not be acquired by the parameter acquiring part 47.

The display control part 48 controls the display in the jam information display region 60 of the display 20. The display control part 48 displays an indicator bar 61 of a length corresponding to the jam level LJ acquired by the parameter acquiring part 47 on the display 20. In addition, the display control part 48 displays an indicator mark 62 at a position corresponding to the reference jam level LJref acquired by the parameter acquiring part 47.

Figure 7:
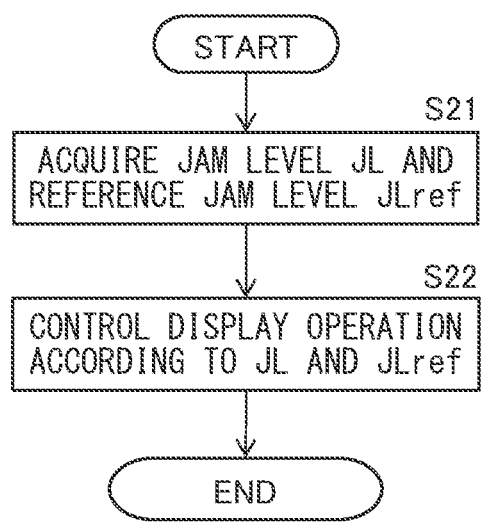
FIG. 7 is a flow chart of notification processing performed by the ECU.

FIG. 7 is a flow chart of notification processing performed by the ECU 21. As shown in FIG. 7, first, the parameter acquiring part 47 acquires the jam level LJ and the reference jam level LJref from the jam degree calculating part 44 and the driving mode setting part 45 (step S21). Next, the display control part 48 controls the display of the display 20 in accordance with the acquired jam level LJ and reference jam level LJref (step S22). Specifically, in the present embodiment, it controls the display of the indicator bar 61 and the indicator mark 62 in accordance with the jam level LJ and the reference jam level LJref.

Note that, in the present embodiment, the display 20 displays the jam level LJ and the reference jam level LJref as respectively the indicator bar 61 and the indicator mark 62. However, the jam level LJ and the reference jam level LJref may also be displayed by other ways. Specifically, for example, the jam level LJ and the reference jam level LJref may both be displayed as numerical values. Therefore, the display control part 48 can be said to perform display relating to the values of the jam related parameters and reference values corresponding to the reference jam degree.

Action and Effect

According to the present embodiment, the display 20 displays an indicator bar 61 changing in accordance with the jam level LJ. Therefore, the driver can confirm how the jam degree of the surroundings of the vehicle 100 is grasped by the ECU 21. Further, in the present embodiment, the display 20 displays an indicator mark 62 corresponding to the reference jam level LJref. Therefore, the driver can confirm the degree of divergence between the reference jam level LJref at which the driving mode is switched and the current jam level LJ. As a result, the driver can obtain a grasp of extent of change in the jam degree in the surroundings of the vehicle 100 necessary for the driving mode to be switched. In particular, in the present embodiment, as the parameters showing the jam degree, only respectively one jam level LJ and reference jam level LJref are shown, therefore the driver can easily intuitively grasp the current jam degree or the extent of change in the jam degree necessary for the driving mode to be switched.

Second Embodiment

Next, the vehicle control system 1 and the notification device according to the second embodiment will be explained. Below, the parts different from the vehicle control system 1 and the notification device according to the first embodiment will be focused on in the explanation.

In the above first embodiment, the driving mode setting part 45 sets the driving mode of the vehicle 100 based on whether one parameter (jam degree) calculated by the jam degree calculating part 44 is equal to or greater than the reference value. As opposed to this, in the present embodiment, values of a plurality of the jam related parameters, which change in accordance with the jam degree, are calculated by the jam degree calculating part 44, and the driving mode setting part 45 sets the driving mode of the vehicle 100 based on the values of the plurality of j am related parameters.

In the present embodiment, the jam degree calculating part 44 does not calculate the jam level LJ, but calculates the ego vehicle term HV, surrounding vehicle term CV, and density term VD as the jam related parameters, as explained above.

Further, in the present embodiment, the driving mode setting part 45 sets the driving mode based on the jam related parameters calculated by the jam degree calculating part 44, that is, the values of the ego vehicle term HV, surrounding vehicle term CV, and density term VD. Specifically, the driving mode setting part 45 sets the driving mode to the automated driving mode with a low degree of contribution of the driver to driving, when the value of the ego vehicle term HV is equal to or greater than the ego vehicle term reference value HVref, the value of the surrounding vehicle term CV is equal to or greater than the surrounding vehicle term reference value CVref, and the value of the density term VD is equal to or greater than the density term reference value VDref. On the other hand, when the value of the ego vehicle term HV is the less than the ego vehicle term reference value HVref, the value of the surrounding vehicle term CV is less than the surrounding vehicle term reference value CVref, or the value of the density term VD is less than the density term reference value VDref, it sets the driving mode to the driving assistance mode with a high degree of contribution of the driver to driving. Note that, the ego vehicle term reference value HVref, surrounding vehicle term reference value CVref, and density term reference value VDref are values which the ego vehicle term, surrounding vehicle term, and density term take at the time of the reference jam degree.

Figure 8:
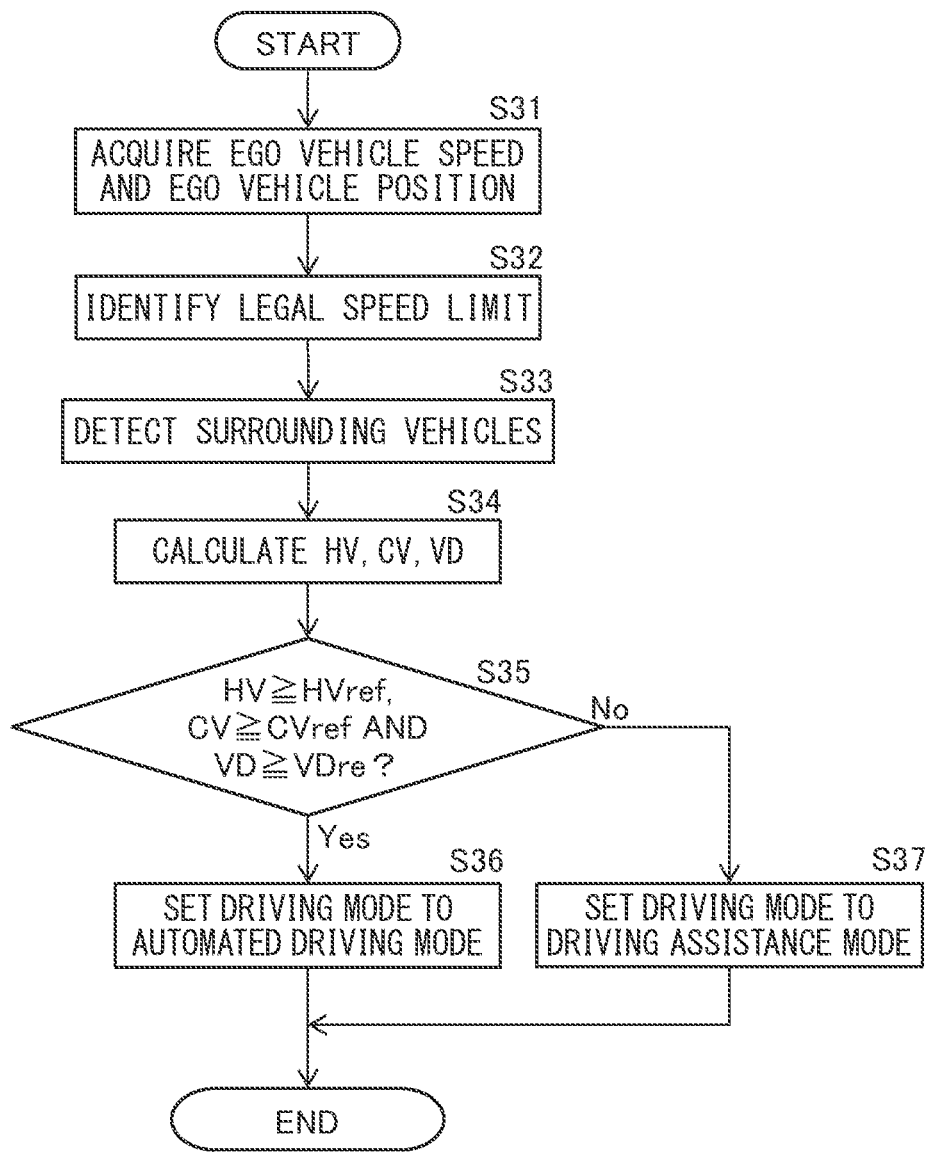
FIG. 8 is a flow chart, similar to FIG. 5, of driving control processing performed by the ECU according to the second embodiment.

FIG. 8 is a flow chart, similar to FIG. 5, of the driving control processing performed by the ECU 21 according to the second embodiment. Steps S31 to S33 of FIG. 8 are similar to steps S11 to S13 of FIG. 5, therefore explanations will be omitted.

If at step S33 the positions, speeds, and sizes of the surrounding vehicles are detected, next, the jam degree calculating part 44 calculates the values of the ego vehicle term HV, surrounding vehicle term CV, and density term VD (step S34). The jam degree calculating part 44, for example, uses the above formulas (2) to (4) to calculate the values of the terms.

If the values of the ego vehicle term HV, surrounding vehicle term CV, and density term VD are calculated, the driving mode setting part 45 judges whether the calculated value of the ego vehicle term HV is equal to or greater than the ego vehicle term reference value HVref, whether the calculated value of the surrounding vehicle term CV is equal to or greater than the surrounding vehicle term reference value CVref, and whether the calculated value of the density term VD is equal to or greater than the density term reference value VDref (step S35). At step S35, if it is judged that the value of the ego vehicle term HV is equal to or greater than the ego vehicle term reference value HVref, the value of the surrounding vehicle term CV is equal to or greater than the surrounding vehicle term reference value CVref, and the value of the density term VD is equal to or greater than the density term reference value VDref, the driving mode setting part 45 sets the driving mode at the automated driving mode (step S36). On the other hand, if at step S35 it is judged the value of the ego vehicle term HV is less than the ego vehicle term reference value HVref, it is judged that the value of the surrounding vehicle term CV is less than the surrounding vehicle term reference value CVref, or it is judged that the value of the density term VD is less than the density term reference value VDref, the driving mode setting part 45 sets the driving mode to the driving assistance mode (step S37).

Figure 9:
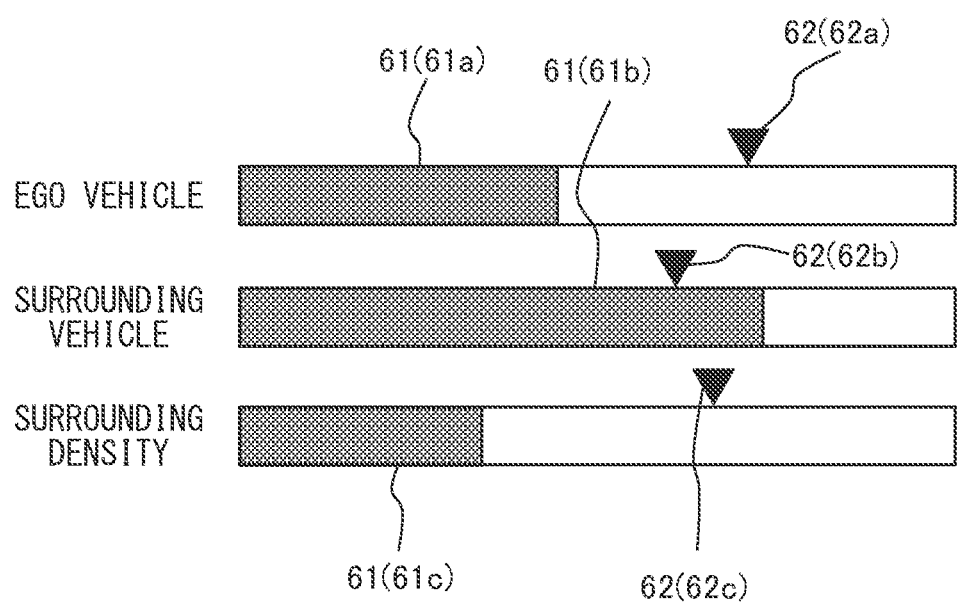
FIG. 9 is an enlarged view showing a jam information display region of a display in the second embodiment.

FIG. 9 is an enlarged view showing the jam information display region 60 of the display 20 in the present embodiment. As shown in FIG. 9, the jam information display region 60 displays three indicator bars 61 and three indicator marks 62 respectively corresponding to the indicator bars 61.

Among the three indicator bars 61, the first indicator bar 61*a* shows the value of the ego vehicle term HV calculated by the jam degree calculating part 44 and becomes longer in length from a reference (left end in figure) as the value of the ego vehicle term HV becomes higher. Further, among the three indicator marks, the first indicator mark 62*a* shows the ego vehicle term reference value HVref and is arranged to point to the position which the first indicator bar 61*a* reaches when becoming the length corresponding to the ego vehicle term reference value HVref.

The second indicator bar 61*b* shows the value of the surrounding vehicle term CV calculated by the jam degree calculating part 44 and becomes longer in length from a reference (left end in figure) as the value of the surrounding vehicle term CV becomes larger. Further, the second indicator mark 62*b* shows the surrounding vehicle term reference value CVref and is arranged to point to the position which the second indicator bar 61*b* reaches when becoming the length corresponding to the surrounding vehicle term reference value CVref.

The third indicator bar 61*c* shows the value of the density term VD calculated by the jam degree calculating part 44 and becomes longer in length from a reference (left end in figure) as the value of the surrounding vehicle term VD becomes larger. Further, the third indicator mark 62*c* shows the density term reference value VDref and is arranged to point to the position which the third indicator bar 61*c* reaches when becoming the length corresponding to the density term reference value VDref.

Note that, in the present embodiment as well, the display 20 displays the indicator bar 61 and indicator mark 62. However, the display 20 may display the values of the jam related parameters and their reference values together as numerical values.

The notification processing displaying the jam level LI, etc., on the display 20 in this way to notify the jam level of the surroundings of the vehicle 100, like in the first embodiment, is performed by the notification control part 332 of the processor of the ECU 21.

According to the present embodiment, the display 20 displays indicator bars 61*a* to 61*c* changing in accordance with the ego vehicle term HV, surrounding vehicle term CV, and density term VD. Therefore, the driver can more accurately obtain a grasp of how the jam degree of the vehicle 100 is grasped by the ECU 21. Further, in the present embodiment, since different indicator bars 61*a* to 61*c* are used for the different items, the driver can grasp items to be changed and degree of change necessary for the driving mode to be switched.

In the second embodiment, as the jam related parameters, the ego vehicle term HV, surrounding vehicle term CV, and density term VD are used. However, as the jam related parameters, instead of these parameters or in addition to these parameters, other parameters (for example, the value of the speed of the vehicle 100 divided by the acceleration, the value of the average speed of the surrounding vehicle divided by the average acceleration, the value of the difference of the speed of the preceding vehicle and the legal speed limit divided by the speed of the preceding vehicle, the value of the speed of the preceding vehicle divided by the acceleration, etc.) may also be used.

Further, in the second embodiment, the driving mode setting part 45 switches the driving mode, based on whether all of the jam related parameters of the ego vehicle term HV, surrounding vehicle term CV, and density term VD are equal to or greater than the respectively corresponding reference values. However, the driving mode setting part 45 may also switch the driving mode, based on whether some of the jam related parameters are equal to or greater than the respectively corresponding reference values. Therefore, the driving mode setting part 45, for example, may switch the driving mode, based on whether two among the three jam related parameters are equal to or greater than the respectively corresponding reference values.

Further, in the above second embodiment, the reference values of the parameters may have respective hysteresis. Therefore, the driving mode setting part 45 switches the driving mode to the automated driving mode when the value of the ego vehicle term HV is equal to or greater than the ego vehicle term reference value HVref, the value of the surrounding vehicle term CV is equal to or greater than the surrounding vehicle term reference value CVref, and the value of the density term VD is equal to or greater than the density term reference value VDref. Further, it switches the driving mode to the driving assistance mode with a higher degree of contribution of the driver to driving, when the value of the ego vehicle term HV is less than the ego vehicle term reference value HVref, the value of the surrounding vehicle term CV is less than the surrounding vehicle term reference value CVref, and the value of the density term VD is less than the density term reference value VDref.

Further, the reference values of the parameters may be changed based on some sort of other parameters other than the jam related parameters. For example, the reference values of the surrounding vehicle term CV and the density term VD may be changed in accordance with the speed of the vehicle 100.

If considering the above, in the present embodiment, if the values of predetermined parameters among the plurality of the jam related parameters are respectively values showing higher j am degrees than the reference values, the vehicle 100 is driven by the second driving mode (in the above-mentioned example, the automated driving mode). In addition, if the above predetermined parameters are respectively values showing lower jam degrees than the reference values, the vehicle 100 is driven by the first driving mode with a higher degree of contribution of the driver to driving than the second driving mode (in the above-mentioned example, driving assistance mode).

In addition, in the above second embodiment, the corresponding indicator bars 61a to 61c and the corresponding indicator marks 62a to 62c are displayed by the display 20 for all of the three jam related parameters. However, the display 20 may display only some of the jam related parameters used for judgment of switching of the driving mode.

In this case, for example, when the driving mode is set to the driving assistance mode, the display control part 48 may display only the indicator bar 61 and the indicator mark 62 relating to a parameter of less than the corresponding reference value among the plurality of the jam related parameters, and does not display the indicator bar 61 and the indicator mark 62 relating to a parameter of equal to or greater than the corresponding reference value among the plurality of the jam related parameters.

Similarly, when the driving mode is set to the automated driving mode, the display control part 48 may display only the indicator bar 61 and the indicator mark 62 relating to a parameter of equal to or greater than the corresponding reference value among the plurality of the jam related parameters (in the above second embodiment, the ego vehicle term, surrounding vehicle term, and density term), and does not display the indicator bar 61 and the indicator mark 62 relating to a parameter of less than the corresponding reference value among the plurality of the jam related parameters.

Further, in the above embodiment, the driving mode is switched between the automated driving mode and the driving assistance mode, based on only the value of the jam related parameters. However, the driving mode may also be switched between the automated driving mode and the driving assistance mode, based on other parameters with no or little relevance with the jam degree of the surroundings of the vehicle 100 in addition to the value of the jam related parameters.

Above, preferred embodiments according to the present invention were explained, but the present invention is not limited to these embodiments. Various corrections and changes may be made within the language of the claims.

The invention claimed is:

1. A notification device to a driver used in a vehicle enabling automated driving in which if the value of at least one jam related parameter changing in accordance with a jam degree of surroundings of the vehicle is a value showing a jam degree lower than a reference value corresponding to a reference jam degree, the vehicle is driven in a first driving mode, and if the value of the jam related parameter is a value showing a jam degree higher than the reference value, the vehicle is driven in a second driving mode with a lower degree of contribution of the driver to driving than the first driving mode, the notification device comprising a processor,
wherein the processor is configured to notify the driver of the jam degree of surroundings of the vehicle and the reference value on a display device of the vehicle display signs relating to the value of the jam related parameter and the reference value in a display region of the display device; wherein the jam degree of surroundings of the vehicle is displayed as an indicator bar that becomes longer as the jam level becomes higher, and the reference value is displayed as an indicator mark that is a threshold at which the jam level results in a change of the driving mode.

2. The notification device according to claim 1, wherein the driving mode of the vehicle is set based on the value of one of the jam related parameters, and
the processor is configured to make the display device display signs relating to the value of the one jam related parameter and the one reference value.

3. The notification device according to claim 1, wherein the driving mode of the vehicle is set to the second driving mode if the value of a predetermined parameter among a plurality of the jam related parameters is a value showing a higher jam degree than the respective reference value, and is set to the first driving mode if that predetermined parameter is a value showing a lower jam degree than the reference value, and
the processor is configured to make the display device display signs relating to values of part or all of the plurality of parameters among the jam related parameters and the reference values of that plurality of parameters.

4. The notification device according to claim 3, wherein the processor is configured not to make the display device display signs relating to the value of the jam related parameter becoming a value showing a higher jam degree than the reference value among the plurality of jam related parameters when the driving mode of the vehicle is the first mode and the reference value corresponding to the jam related parameter.

5. The notification device according to claim 1, wherein the jam related parameters include parameters changing in accordance with at least one of a difference between a speed of the vehicle and a legal speed limit of the road on which the vehicle is running, a difference of speeds of other vehicles in the surroundings of the vehicle and the legal speed limit, and a density or number of presence of other vehicles in a surrounding region of the vehicle.

6. The notification device according to claim 1, wherein a reference value when the driving mode of the vehicle is the first driving mode is a value showing a higher jam degree than a reference value when the driving mode is the second driving mode.

\* \* \* \* \*